United States Patent Office 2,965,566
Patented Dec. 20, 1960

2,965,566
OIL BASE DRILLING AND FRACTURING FLUID

Raymond W. Hoeppel, Oak View, Calif., assignor to Sespe Laboratories, Ventura, Calif.

No Drawing. Filed Aug. 13, 1956, Ser. No. 603,792

12 Claims. (Cl. 252—8.5)

This invention relates to drilling fluid or fracturing fluid compositions such as are employed in the drilling and pressure fracturing of oil and gas wells, and in particular concerns fluids of the oil base type which may also contain water dispersed in the inner phase.

In drilling oil or gas wells by means of rotary drilling tools, a hollow drill pipe known as a drill stem having a bit attached to its lower end is extended downwardly through the well bore and rotated while the bit is pressed against the working face in the formation at the bottom of the hole. The action of the rotating bit grinds away the formation as the drilling progresses. During the drilling, a fluid body known as a drilling fluid or mud is continuously circulated downwardly through the drill stem, through the bit, and against the working face of the hole, and then upwardly to the surface through the annular space between the drill stem and the wall of the bore hole. The drilling fluid serves a number of purposes, among which are cooling and lubricating the drill bit, suspending and removing cuttings from the hole, preventing the flow of liquids or gases from the formations traversed by the bore into the same by applying hydrostatic pressure to such formations, and fulfilling other requirements.

In locations where the underground formations traversed and/or penetrated by the bore contain materials such as hydratable clays which swell and/or disintegrate in the presence of water, it has become customary to employ drilling fluids which are either substantially free of water or contain water as the internal phase of a water-in-oil emulsion. These types of fluids are termed "oil base" and "emulsion base" fluids, respectively, although the oil base fluids almost invariably contain small amounts of water and are hence, strictly speaking, also emulsions. In addition to the base liquid, these drilling fluids contain minor proportions of various agents adapted to impart special properties to the composition, e.g., wall-building agents, such as asphalt, to coat or plaster the walls of the bore with a fluid-impermeable layer; weighting agents which serve to increase the apparent density of the composition; dispersing agents which serve to maintain the solid components uniformly dispersed in the liquid base medium; viscosity modifiers; gel strength agents; hydration inhibitors; etc.

In fracturing operations, a liquid which may or may not contain suspended sand, is forced under high pressure into an oil producing zone in an effort to fracture the oil bearing strata along natural cleavage planes and thus reduce the resistance of the strata to the flow of produced oil. The sand tends to keep the fractured zones propped open, after release of pressure of the fracturing fluid, and thus tends to maintain the initial higher permeability.

If aqueous fracturing solutions are employed, some swelling of clays in the production zone might occur, resulting in a lowered permeability. Consequently, oil base fracturing fluids are usually used. It is desirable that a fracturing fluid have some ability to suspend solids and that it also be of low viscosity so that it will not impede the flow of the production oil after it has performed its function of fracturing the strata. It is also desirable that a fracturing fluid have the property of not rapidly leaking away through semi-permeable strata, in order that the pressure at the fractured zone may be maintained at a high level at moderate pumping rates.

Among the various properties requisite to a satisfactory drilling fluid, that of coating the walls of the hole with a thin impermeable solid layer is one or the most important. Such a layer serves to prevent the leaking away of the drilling fluid into porous formations traversed by the bore. In oil base muds it has been conventional to employ asphalts, or from 40 to 60% water in a dispersed phase, to retard this fluid loss and seal the hole. The effectiveness of such agents in lowering fluid loss is conveniently measured by determining the so-called "filtration rate" or "fluid loss" by means of a simple filtration test wherein a sample of the fluid is forced against a permeable membrane or filter paper under standardized conditions of temperature and pressure. The quantity of filtrate collected in 30 minutes is recorded. Detailed procedure for making this determination is set forth in "Recommended Practice on Field Procedure for Testing Drilling Fluids," API Code No. 29, July 1942. Since the fluid loss value of a drilling fluid may vary considerably with temperature, it should be determined at a temperature which is at least as high as that which will be encountered in the bore hole. In the standard fluid loss test a pressure of 100 p.s.i. is employed.

A second property which is desirable in drilling fluids is that of thixotropic gel strength, i.e., the property of being relatively fluid during agitation but capable of setting up into a gel-like body when allowed to stand quiescent. This property permits cuttings to remain suspended in the fluid when circulation is stopped, but still allows the fluid to be readily circulated. Usually, the gel strength properties of drilling fluids are determined with the aid of a Stormer viscosimeter as described in the aforementioned API Code No. 29. The initial gel strength is determined as the force in grams necessary to produce $\frac{1}{8}$ turn of the viscosimeter rotor from a stationary position immediately after agitating the fluid, and is preferably as low as possible, e.g., 0–1 gram. The 10-minute gel strength value is determined in the same manner, after the fluid has been allowed to stand quiescent for 10 minutes, and is preferably of the order of 1–10 grams.

At the present time, most oil base and emulsion base drilling fluids, as heretofore mentioned, include a certain proportion of asphalt. Such asphalt base oils have a relatively high viscosity, particularly at lower temperatures. As a consequence, from an operating standpoint, asphalt base oils are difficult to handle, for example, in colder climates where the working temperature may be above 150° F. and the storage temperature below freezing.

The property of relatively high viscosity, characterizing asphalt base oils, additionally detracts from the overall effectiveness of the drilling or fracturing fluids. Higher pumping pressures are required and considerable difficulty is oftentimes experienced in removing cuttings from such fluids by shaker screens. Further, it is apparent that such thick fluids tend to retard the drilling rate and, thus, increase the cost of well operations. In this regard, it will be appreciated that considerable time may be required in order to properly permit the accumulated sand in the fluids to settle out in the mud pits.

Heretofore, it has been thought necessary to employ asphalt base oils in order to obtain requisite thixotropic and low fluid loss properties desirable for drilling or fracturing fluids.

It is, therefore, an object of the present invention to provide an oil base fluid for oil well drilling for fracturing purposes, which is characterized by a relatively low viscosity and yet which has sufficient thixotropic properties to enable it to adequately support weight materials and conform with the other requirements of such a fluid.

Another object is to provide an oil base drilling fluid that is easily pumped, flows readily through vibratory screens and enables a high drilling rate to be maintained.

Another object is to provide an oil base drilling fluid that will have good fluid loss characteristics without the use of asphalt or large quantities of water or solids, and which still will tolerate large quantities of water and remain stable.

A further object is to provide a clean fluid which is unobjectionable to handle and which will remain fluid and pumpable over an exceptionally wide temperature range.

A still further object is to provide an oil base fracturing fluid of low viscosity which will not easily leak away into porous formations, thus providing for maximum fracturing pressure at moderate pumping rates.

These and other objects of this invention are achieved in accordance with the following detailed description of my improved oil base drilling and fracturing fluid.

Generally, I have now found that the above and related objects may be realized by incorporating in the oil base drilling or fracturing fluid an unsaturated aliphatic carboxylic acid, together with water, a trivalent metal salt and an alkaline earth base or alkaline earth basic reacting salt. Solids or weight material may be present or absent. Preferably, diesel oil or an equivalent lighter oil is used although heavier oils may be less satisfactorily employed.

Reference may be had to my previous invention for "Oil Base Drilling Fluids," which issued as U.S. Patent No. 2,754,265, wherein the importance of the use of a heavy metal salt is set forth. However, it will be noted that the rosin acid formerly used has been replaced in my present invention by an unsaturated aliphatic carboxylic acid.

The unsaturated acid may be added as a soap if desired, but the trivalent metal salt and the base must also be added to attain low fluid loss and other desirable properties. The unsaturated acid should be present in amounts of 0.5 to 5%, based on an unweighted fluid. It should have at least 8 carbon atoms and must have one or more double bonds. It may be a mixture of unsaturated aliphatic acids and may contain minor amounts of saturated fatty acids or rosin acids without adversely affecting the resulting oil base fluid. Satisfactory acids include oleic, linoleic, linolenic, tall oil acids, vegetable oil or animal type mixed fatty acids, and the like.

At least 1% water should be present, but as much as 60% water may be present without impairing the stability of the fluid. Trivalent metal salts that may be used include salts of iron, aluminum, chromium, cerium, etc. These should be present in amounts of 20 to 400 milliequivalents per liter. Oils may vary from diesel to light fuel oils or crudes. Where the viscosity must be low, as with fracturing fluids, or where a clean fluid is desired, or where much water is present, the lighter oils are used.

The exact manner and order in which the ingredients are added is not of primary importance. A convenient method is to prepare a liquid concentrate of the carboxylic acid, trivalent salt and water in an oil base. This is then added to the major quantity of oil at the time of makeup of the fluid and the base is then added. Thorough agitation is desirable to effect homogenization. If desired, the water may be added immediately prior to agitation rather than in the initial concentrate.

If desired, a dry type of concentrate may be prepared by absorbing the carboxylic acid and trivalent metal salt on a finely divided solid filler. The oil base fluid is then prepared by adding this concentrate to an oil containing water and the alkaline earth base.

The following examples will illustrate several ways in which the principle of the invention has been applied, but are not to be construed as limiting the same. All rheological values were determined on the Stormer viscosimeter at a temperature of 120° F. All fluid loss tests were made on a standard Baroid Wall Building Tester according to API Code 29, at a temperature of 180° F. All amounts are expressed in weight percent.

*Example 1*

An oil base fluid was prepared from diesel oil containing 2.2% oleic acid, 8% water, 3% calcium oxide, and ferric chloride or other additives as shown in the table. The fluid was then weighted to 95 pounds per cubic foot with barium sulfate and tested.

| No. | Additives | | Viscosity, cps. | Gel Strength | | Fluid Loss, ml./30 Min. |
|---|---|---|---|---|---|---|
| | Amt., me./l. | Type | | Initial, gms. | 10 Min., gms. | |
| 1 | 0 | None | 26 | 0 | 12 | 43.2 |
| 2 | 100 | ferric chloride | 26 | 0 | 10 | 4.4 |
| 3 | 170 | hydrochloric acid | 22 | 0 | 8 | 44.4 |
| 4 | 190 | magnesium chloride | 28 | 0 | 10 | 35.6 |
| 5 | 100 | ferrous sulfate | 28 | 0 | 10 | 46.6 |

On standing 18 hours barium sulfate did not settle out of any of the above fluids.

The results indicate that the trivalent salt, ferric chloride, together with lime, had a very pronounced effect in reducing the fluid loss without materially altering the rheological or suspending properties of the fluids. In contrast, the bivalent salts, magnesium chloride, and ferrous sulfate still produced a high fluid loss, despite an increase in viscosity. Hydrochloric acid produced no reduction in fluid loss, thus demonstrating that the remarkable effect of the ferric chloride was not due to its acidic nature, but rather to the ferric cation itself.

When test #2 was duplicated, except that a mixture of fatty acids containing 61% linoleic acid, 29% oleic acid, 6% linolenic acid and 9% palmitic and stearic acids were substituted for oleic acid, the fluid loss was reduced to 4.0 ml., thus indicating that a mixture of various unsaturated and saturated aliphatic carboxylic acids also are effective fluid loss retarders when used in the manner dictated.

When test #2 was duplicated, except that the barium sulfate was omitted, the 30-minute fluid loss was 4.5 ml., and the viscosity was 3.5 centipoises.

*Example 2*

An oil base fluid was prepared from diesel oil containing 3.3% mixed tall oil fatty and rosin acids, 3.3% calcium oxide, 8% water, and trivalent heavy metal salts as shown in the table. The fluid was then weighted to 95 lb. cu. ft. with barium sulfate and tested.

| No. | Trivalent Heavy Metal Salts | | Viscosity, cps. | Gel Strength | | Fluid Loss, ml./30 Min. |
|---|---|---|---|---|---|---|
| | me./l. | Type | | Initial, gms. | 10 Min., gms. | |
| 1 | 0 | None | 18 | 0 | .3 | 30.2 |
| 2 | 200 | aluminum chloride | 17 | 0 | 1 | 11.8 |
| 3 | 200 | chromic chloride | 18 | 0 | 3 | 9.5 |
| 4 | 200 | ferric sulfate | 19 | 0 | 3 | 8.5 |
| 5 | 60 | ferric chloride | 20 | 0 | 4 | 7.3 |

The mixed fatty and rosin acids above contained 62% unsaturated fatty acids, 7% saturated fatty acids, 29% rosin acids and 2% unsaponifiables. These mixed acids produced a pronounced reduction in fluid loss when aluminum, chromic or ferric salts were present, together with calcium oxide, but the fluid loss was very high in the absence of the trivalent salts. Despite the extremely low viscosity, weight material remained suspended in all of the fluids.

*Example 3*

An oil base fluid was prepared in diesel oil containing 51% water, 1.3% oleic acid, 0.6% ferric chloride and 2.6% calcium oxide. This fluid was weighted to 74 lb./cu. ft. with barium sulfate. The resultant water in oil emulsion was stable, suspended the weight material satisfactorily and had a 30 minute fluid loss of 1.8 ml. at 180° F.

*Example 4*

An oil base drilling fluid was prepared in a No. 5 black fuel oil, weighted to 72 lb./cu. ft. with barium sulfate. The fluid contained 1% oleic acid, 1.7% water, and 2.3% calcium oxide. It had a viscosity of 66 centipoises at 120° F. Its 30-minute fluid loss at 180° F. was 30.5 ml. When this test was repeated with 0.4% ferric chloride present, the viscosity was unaltered, but the 30-minute fluid loss at 180° F. was reduced to 0.9 ml.

*Example 5*

An oil base fluid was prepared from diesel oil containing 3.3% sodium oleate soap, 3.3% calcium oxide and 8% water. When weighted to 95 lb./cu. ft. with barium sulfate, it had a 30-minute fluid loss of 24.2 ml., and supported weight material satisfactorily.

When 100 me./l of ferric chloride also was present the 30-minute fluid loss was reduced to 2.2 ml. and the weight material was satisfactorily suspended.

When the latter test, wherein ferric chloride was present, was repeated, except that calcium oxide was omitted, the 30-minute fluid loss was greater than 50 ml., but when 2% magnesium carbonate was then added, the fluid loss was reduced to 4.0 ml. and the weight material was satisfactorily suspended.

These tests of Example 5 illustrate that a soap such as sodium oleate may be used to give a low fluid loss instead of oleic acid, provided a trivalent salt and an alkaline earth compound are both present. If either the trivalent salt or the alkaline earth compound are omitted the fluid loss is high.

As will be apparent to those skilled in the art, many variations are possible without departing from the scope of the invention. Such variations or modifications may include the use of viscosity modifiers, other types of weighting agents such as hematite or calcium carbonate, various blends of base oils, various alkaline earth bases or basic salts, and various mixtures of carboxylic acids with unsaturated aliphatic acids. The essence of the invention lies in the use of trivalent metallic salts in combination with unsaturated aliphatic carboxylic acids and alkaline earth basic compounds. Various usages include oil well drilling fluids and fracturing fluids.

Other modes of applying the principle of my invention may be employed, change being made as regards the materials or procedure employed provided the composition stated in any of the following claims, or the equivalent of such composition, be obtained.

What is claimed is:
1. A low viscosity and low fluid loss drilling and fracturing fluid composition prepared by dispersing in a mineral substantially asphalt-free oil: (1) between about 0.5 and about 5 percent by weight of unsaturated aliphatic carboxylic acids containing at least 8 carbon atoms; (2) between about 1 and about 60 percent by weight of water; (3) between about 1 and about 5 percent by weight of an alkaline earth base; and (4) a water soluble salt of a trivalent heavy metal in an amount representing between about 20 and 400 milli-equivalents per liter of the entire composition.

2. A drilling and fracturing fluid composition according to claim 1 and containing a finely divided solid weight material dispersed therein.

3. A drilling and fracturing fluid composition according to claim 1 and containing sand dispersed therein.

4. A drilling and fracturing fluid composition according to claim 1 and containing a minor proportion of saturated aliphatic carboxylic acids.

5. A drilling and fracturing fluid composition according to claim 1 and containing a minor proportion of cyclic carboxylic acids.

6. A drilling and fracturing fluid composition according to claim 1 and containing between about 0.1 and about 15 percent by weight of a water soluble alkaline earth metal salt.

7. A drilling and fracturing fluid composition according to claim 1 and containing between about 0.1 and about 15 percent by weight of a mixture of water soluble alkali and alkaline earth metal salts.

8. A drilling and fracturing fluid composition according to claim 1 wherein the unsaturated aliphatic acids are a mixture of oleic and linoleic acids.

9. A drilling and fracturing fluid composition according to claim 1 wherein the unsaturated aliphatic carboxylic acids are present as metallic soaps.

10. A drilling and fracturing fluid composition according to claim 1 wherein the alkaline earth base is calcium oxide.

11. A drilling and fracturing fluid composition according to claim 1 wherein the alkaline earth base is calcium hydroxide.

12. A drilling and fracturing fluid composition according to claim 1 where the trivalent heavy metal salt is a water soluble salt of iron.

References Cited in the file of this patent

UNITED STATES PATENTS

| | | |
|---|---|---|
| 2,099,825 | Rolshausen et al. | Nov. 23, 1937 |
| 2,599,752 | Fischer | June 10, 1952 |
| 2,618,596 | Minich | Nov. 18, 1952 |
| 2,667,457 | McChrystal | Jan. 26, 1954 |
| 2,702,787 | Freeland | Feb. 22, 1955 |
| 2,751,360 | Van Strien | June 19, 1956 |
| 2,754,265 | Hoeppel | July 10, 1956 |
| 2,793,188 | Swain et al. | May 21, 1957 |